July 11, 1950
J. E. CHAPMAN
2,514,693
MOTOR ASSEMBLY WITH MAGNETIC BRAKE
Filed June 21, 1944
2 Sheets-Sheet 1
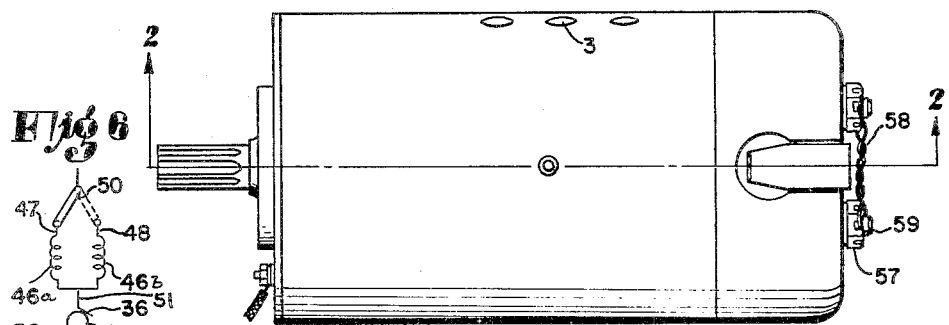
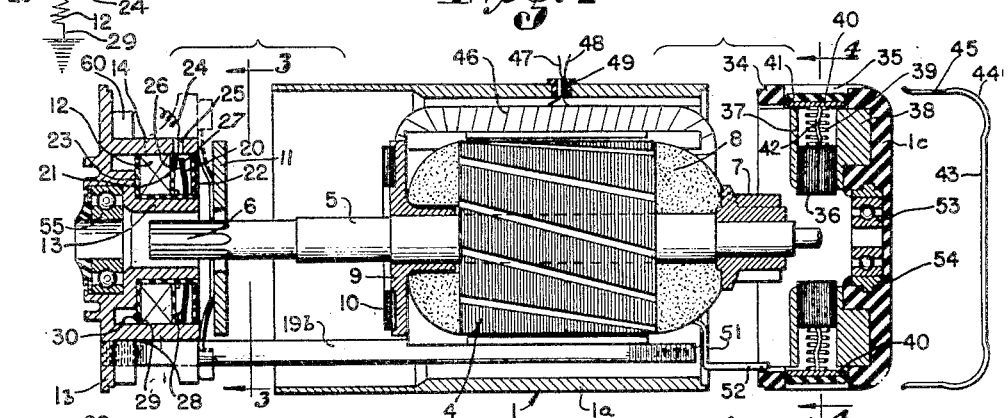
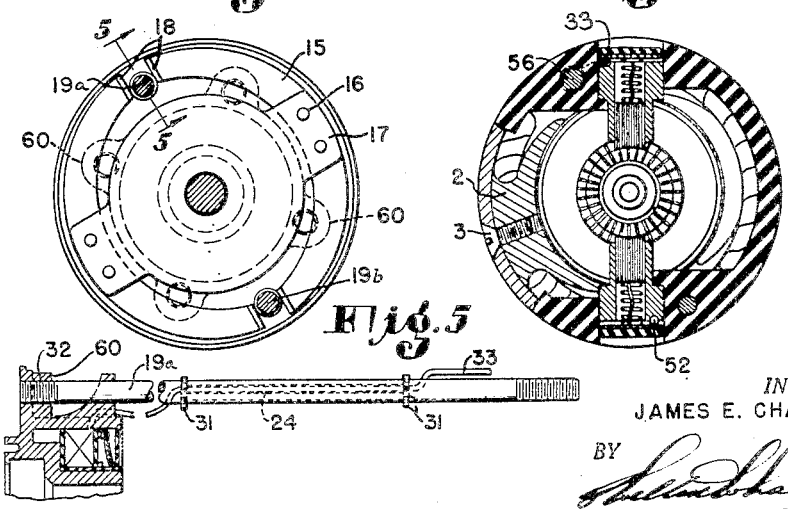
INVENTOR.
JAMES E. CHAPMAN
BY
ATTORNEY

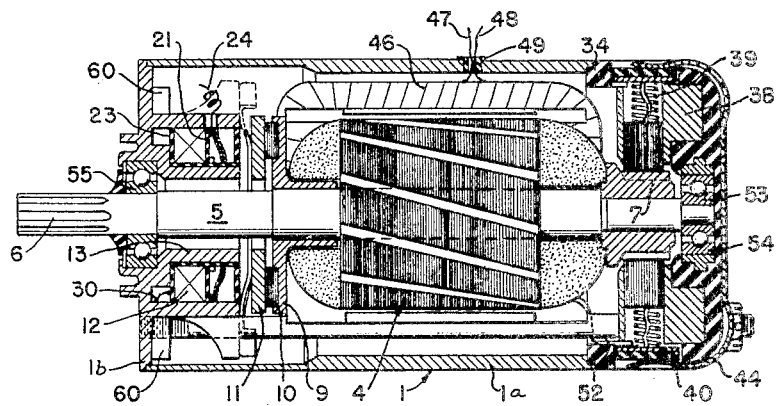

Patented July 11, 1950

2,514,693

UNITED STATES PATENT OFFICE 2,514,693

MOTOR ASSEMBLY WITH MAGNETIC BRAKE

James E. Chapman, Phoenix, Ariz., assignor to The Garrett Corporation, Los Angeles, Calif., a corporation of California Application June 21, 1944, Serial No. 541,312

14 Claims. (Cl. 172—36)

This invention relates to motors and, while the invention is applicable to motors of any size, it is expected to have its greatest utility when applied in the construction of relatively small electric motors.

When it is necessary to take apart a small motor as ordinarily constructed it becomes necessary to remove many screws or bolts and sometimes soldered wires must be broken away at soldered points. The reassembling of such a motor is also accomplished with difficulty.

One of the objects of this invention is to provide a motor of simple construction which can be very easily assembled and taken apart without necessitating the removal of a great number of fastening screws or bolts and without breaking apart any soldered connections. This is very advantageous because in many situations where such motors are employed—for example, on airplanes —it may be necessary to effect repairs at a point remote from repair shops and where the repairing must be effected without having a mechanic available; and often without having at hand any special tools suitable for such repair work.

Another object of the invention is to produce a motor, the casing of which is divided into one or more sections, each section carrying some of the working parts of the motor to which access can be had readily after the sections have been separated from each other; also to provide such a construction with parts having features which will enable the motor circuit to be established automatically, as it were, when the sections of the casing are put together.

Another object of the invention is to provide an easily assembled motor having a casing body and disconnectable caps, each of said caps carrying working parts or controlling parts for the motor; and to provide means whereby any necessary working circuits will be established through the motor and through the electrical parts in the two caps when the caps are placed in position when being attached to the casing body.

Another object of the invention is to provide a well housed motor with improved means for carrying the brushes that cooperate with the commutator, and to mount the same so that they can be readily removed and replaced from the outside of the casing and without necessitating taking the motor apart.

Another object of the invention is to provide a cap assembly for a motor of this type in which the brushes and the bearing for the motor shaft are carried in a one-piece cap.

Another object of the invention is to provide a cap assembly for a motor of this type which will not only include a bearing for the motor shaft, but which will also carry an electrically controlled brake for the motor and a thermostatic circuit breaker so placed that it will operate to break the circuit if the adjacent parts of the motor become too hot for safety.

Further objects of the invention will appear hereinafter.

The invention consists in the novel parts and combinations of parts to be described hereinafter, all of which contribute to produce an easy assembling motor.

A preferred embodiment of the invention is described in the following specification, while the broad scope of the invention is pointed out in the appended claims.

In the drawing:

Fig. 1 is a plan of a motor embodying my invention.

Fig. 2 is a longitudinal section through the motor illustrated in Fig. 1, taken about on the line 2—2 of Fig. 1, but illustrating the end caps of the casing separated from the casing body.

Fig. 3 is an elevation showing the inner side of the left hand cap illustrated in Fig. 2. This view is taken about in the plane of the line 3—3 of Fig. 2.

Fig. 4 is a vertical section taken about on the line 4—4 of Fig. 2 through the right hand head as illustrated in Fig. 2; but in this view a portion of the section is broken away back into the motor to illustrate a pole of the motor and its relation to its winding.

Fig. 5 is a fragmentary section taken about on the line 5—5 of Fig. 3 and illustrating a tie-bolt that is carried by the left hand cap, and this view shows a portion of the tie-bolt and a conductor carried thereby broken away.

Fig. 6 is a diagrammatic view illustrating the circuit through the motor, at the brake, and through the field coil and the thermo-sensitive member for automatically breaking the motor circuit.

Fig. 7 is a view similar to Fig. 2, with the parts of the motor in assembled position.

Before proceeding to a more detailed description of the invention, it should be stated that in the present specification and drawing the invention is illustrated as applied to a motor having a casing divided into sections. In the present instance there are three of these sections, including a body member and two end sections or caps. The body member is provided on its interior with field coils and poles, and the armature and a shaft are constructed so that they can slip into position axially to cooperate with the field coils and poles.

The two end caps preferably carry bearings for the ends of the shafts, though this is not essential to the invention. One of the end caps is preferably provided with an automatic brake apparatus which applies the brake to stop the rotation of the armature when the motor circuit is broken, and this cap or cap assembly also preferably includes a thermo-sensitive means or device which will operate automatically to break the motor circuit if the parts adjacent to the thermo-sensitive member become overheated.

The cap at the other end of the motor where the commutator for the armature is located also constitutes a cap assembly in which the brushes are mounted which cooperate with the commutator, and slide into operative relation to the commutator when this cap assembly is slid into position axially to seat on it the adjacent end of the casing body. In accordance with this invention, also, when these caps are slid into position on the ends of the casing body, the motor circuit is automatically established through the motor; but of course this motor circuit is controlled by the usual switch on the exterior of the motor.

This cap assembly, which includes the brushes, is preferably constructed so that the brushes can be withdrawn and replaced without removing the cap. In other words, my invention provides for removal and replacement of brushes for a motor through the casing wall of the motor; and this is true, regardless of whether the brushes are mounted in a cap assembly as in the present instance or whether the brushes are mounted in a portion of the casting.

In the present instance I construct the motor of three sections including a casing body 1a, a disconnectable head or cap 1b, located at one end of the body, and a disconnectable head casing or cap 1c at the other end.

In the present instance the body 1a is of tubular form and within it, at two diametrically opposite points, are mounted two poles, such as the pole 2 shown in section in Fig. 4. These poles are attached in any suitable manner diametrically opposite each other, preferably by countersunk machine screws inserted from the outer side of the body.

The armature 4 is rigidly mounted on a shaft 5 which extends all the way through it, the left end of the shaft having a grooved neck 6 enabling the motor to be coupled up to a driven shaft. In this motor illustrated, which is a direct current motor, the other end of the shaft 5 is provided with a commutator 7, the bars of which are connected to the coils 8 of the armature winding.

The end of the armature, remote from the commutator, is provided with a rigid brake member 9 which may have a brake lining or facing 10 of suitable brake material.

The head or cap 1b adjacent this brake member 9 is preferably provided with an electrically controlled brake member 11, which is in the form of a disc mounted to float on the rigid end of the shaft that carries the fluted neck 6. In the present instance, the cap 1b is provided with a brake coil, or solenoid coil, 12, which is located between the hub 13 of the head and the annular portion or shell 14. This head or cap 1b is of a magnetic material so that the hub 13 of the cap operates as a core for attracting the brake member 11 when the coil is energized. In the present instance, when the coil 13 is energized, the magnetic attraction holds the brake member 11 away from the brake facing 10 and lets the motor run free, but whenever the coil 12 is de-energized, the brake member or brake "shoe" 11 is forced by resilient means toward an extreme position and against the brake lining 10 to exert a braking force on the rotor of the motor which, of course, includes the shaft 5 and the armature 4.

The resilient means for applying the brake preferably consists of two arcuate leaf springs (see Figs. 2 and 3) the middle portions of which are attached by bolts located at 16, to diametrically opposite ears or lugs 17 that project outwardly from the body of the brake disc 11.

In order to prevent the brake disc or shoe 11 from rotating, the ends of the springs 15 have bent flanges 18 at their ends which thrust against a fixed part within the cap. In the present instance, they thrust against two tie bolts 19a and 19b which extend longitudinally within the motor and preferably extend all the way through the body 1 and through the right hand cap 1c.

Associated with the brake and preferably immediately back of it, as illustrated in Fig. 2, I prefer to provide a thermally sensitive member which will open the circuit through the motor if the motor commences to overheat. For this purpose, I prefer to employ a bimetallic disc 20 which is located at the end of the coil 12; adjacent its insulation head 21 and between this thermostatic member 20 and the brake shoe 11, I provide another insulation head or disc 22.

Other insulation employed consists of a flanged sleeve 23 which fits over the hub 13.

The wiring into the coil 12 is indicated as coming in on a lead wire 24 through an opening 25 in the outer shell 14 of this cap; this lead wire connects to a contact 26 on the insulating head 21, and the thermostat 20 has a cooperating contact 27 which will engage the contact 26 when the thermostat and the motor are not overheated. The current flowing through the thermostat passes through two engaging contacts 28 at another point, located respectively on the thermostat 20 and on the insulation disc 21, and the contact on the disc 21 is connected to one end of the coil; the other end of the coil is attached to a contact 29 which is connected and grounded to outer shell 14 at 30.

The lead-wire or conductor 24 which connects up to the contact 26 is attached insulatingly alongside of the adjacent tie bolt 19a (see Fig. 5), being passed through clips 31 that project out from the side of this tie bolt. This tie bolt, like the tie bolt 19b, is preferably secured in the head 1b by a thread connection 32. Referring again to Fig. 5, at the other end of this tie bolt 19a, the lead wire 24 has a contact pin 33 which is offset away from the bolt, as will be described more in detail hereinafter, to enable it to close a circuit through a contact to one of the brushes. The bolt 19b is mounted like the bolt 19a, but it does not carry any lead wire.

The cap 1c, located at the other end of the motor, is preferably of molded material such as a suitable plastic, which is preferably formed of an insulating material. This cap has a disc form body and a curved wall or flange 34 formed with oppositely disposed openings 35 through which the two brushes 36 may be inserted from the outside. This is advantageous for the reason that it avoids the necessity for taking off the cap when the brushes must be serviced or replaced.

Each brush is guided in a guide opening 37 formed in a guide block or housing 38 which is molded into the cap when the same is cast. When the cap is in place on the end of the body 1a, these brushes 36 are yieldably pressed toward the commutator by small coil springs 39 which thrust against their outer faces. The outer ends of the springs thrust against contact discs 40 which fit into the openings 35 and are followed up by insulating discs 41. Each brush is connected to its corresponding contact disc 40 by a "pigtail" conductor 42 which has sufficient slack in it to insure that the brush will always be able to have sufficient "follow-up" against the commutator as the forward end of the brush becomes more and more worn away. When the cap 1c is slipped into position for attachment to the body 1a, the contact disc 40 of one of these brushes will align with the offset contact pin 33 which is carried on the tie-bolt 19a and this will establish a circuit connection between this brush and the brake coil 12. In order to retain the brush in the brush guide 38, easily detachable resilient keeper means is employed, and this preferably consists of a metal yoke 43, the body of which is in the form of a bar that extends diametrically across the outer face of the cap 1c, the ends of the bar being provided with bows 44, terminating in fingers 45 respectively that seat themselves against the outer faces of the insulation disc 41.

The field winding 46 includes two oppositely wound coils 46a and 46b (see Fig. 6), one of which will cooperate in a circuit for driving a motor shaft in one direction and the other of which will cooperate to enable the motor to be driven in a reverse direction. The lead-conductors or wires 47 and 48 that connect to these two coils 46a and 46b can be carried through the motor casing at any suitable point, such as through an opening provided with a bushing 49, as illustrated in Fig. 2. By means of a switch, such as the switch 50 in Fig. 6, the circuit can be closed through either of the field coils.

After passing through the field winding, current passes by way of the lead-conductor 41, Fig. 2, to a contact pin 52 which may be formed as an integral part of the lead 41. This contact pin is located to align with the contact plate 40 of the brush which is located diametrically opposite the contact pin 33 that leads from the brushes back to the brake coil 12. When the cap 1c is shoved up into position, this contact pin 52 slides into position to complete the circuit, in the same manner as the contact pin 33.

The cap 1c is provided with a bearing, preferably a ball bearing, 53, which receives the adjacent end of the shaft 5 of the motor. The housing ring 54 for this bearing may be molded into the body of the cap 1c like the brush guides 38.

A similar ball bearing 55 may be provided for the other end of the shaft 5 and this bearing is of course mounted in the cap 1b.

In attaching the caps 1b and 1c to the casing body 1a, the forward ends of the tie bolts 19a and 19b are received in sockets 56 which are drilled in the head 1c, the tie bolts being long enough to project beyond the head 1c so that the threaded ends can receive crown nuts 57 which may be seated on the outer face of the cap and sealed against removal by a sealing wire 58 passing through small transverse holes 59 drilled into the projecting ends of these tie bolts.

Fig. 6 diagrammatically illustrates the wiring arrangement, including the thermo-sensitive member 20 which may be of Invar metal or a similar device which will become deformed sufficiently when overheated to break the circuit at one or both of the contact points 26 or 28.

It will be evident that a motor constructed as described can be very readily taken apart and assembled without the use of special tools and without having to disconnect any wires, or break any soldered points. Furthermore, working parts for the motor excepting the field and armature are carried in the two caps and when the caps are removed, they are quite accessible for servicing or making replacements.

The four bosses 60 on the cap 1b afford means for mounting the motor on a support for it.

Many other embodiments of this invention may be resorted to without departing from the spirit of the invention.

I claim as my invention:

1. In an easily assembled motor, the combination of: a casing body open at its ends, having a field coil and poles within the same; an armature having a shaft and commutator capable of being slid axially into position in the casing body to cooperate with said coil and poles; a casing cap assembly disconnectibly attached to the end of the casing body adjacent to the commutator, with brushes carried therein to engage the commutator, said field and said casing head having cooperating aligning contacts operating to establish the motor circuit through the field coil and the armature when said casing cap is moved axially onto the casing body; a second disconnectible casing cap for the other end of said casing body, with a brake and brake coil carried therein; said second disconnectible casing cap having a lead from the brake coil terminating in a contact; and a contact connected with one of said brushes and operating to engage the same and connect the brake coil to that brush when the second disconnectible casing cap is moved axially into position to secure the same to its end of the casing body.

2. In an easily assembled motor having a commutator rotating within the same, the combination of: a casing member having a wall located adjacent to the commutator, said wall having openings therein to receive brushes; brushes insertable into said openings from outside of said casing, with keeper means, having a portion extending across the outer face of the wall, for retaining the brushes in their openings.

3. A motor construction according to claim 2 including a brush guide formed integrally in said casing member for guiding each brush toward the armature; a contact member located at each opening, and having a flexible metallic connection to its corresponding brush, and means for effecting circuit connections respectively to said contact members for establishing a circuit through the armature.

4. In an easily assembled motor having a commutator rotating within the same, the combination of: a casing member having a wall located adjacent to the commutator, with openings therein to receive brushes; brushes insertable into said openings from outside of said casing; a contact member located at each opening, back of its corresponding brush and having a flexible metallic connection to its brush; a spring located back of each brush for holding the same yieldingly against the armature and a contact member insertable in a lateral direction with respect to the axis of said brush for engaging each contact member to establish a circuit through the brushes and the armature.

5. In an easily assembled motor having a casing body open at its end, the combination of: an armature rotatably mounted within the casing and having a commutator located adjacent the open end of the casing body; a detachable cap for the casing body; brush guides mounted in said cap; said cap having openings opposite said brush guides enabling the brushes to be inserted into the same from the outside; contact heads mounted respectively in said openings metallically connected to the brushes; and a contact member for the motor circuit located in the end of said body adjacent said detachable cap operating to slide into contact with one of said contact heads when the cap is applied and seated on the end of the body by an axial movement, thereby establishing a circuit through the commutator and the armature.

6. An easily assembled motor according to claim 5 including an insulating member mounted in each of said openings, and resilient means for engaging the insulating members on their outer side to hold the same and the contact heads in place.

7. In an easily assembled motor, the combination of: a casing body open at its ends; a field winding and poles carried within the body casing; an armature capable of being slid axially into position to cooperate with said field and poles, and having a shaft projecting at each end from the armature with a commutator located on one end of said shaft and connected with the armature winding; a removable head assembly for the casing body disconnectibly attached to the end adjacent the commutator, with brushes carried in the head to slide into operative contact with the commutator; said head having a bearing for the adjacent end of said shaft; cooperating contact means for the casing and the head for effecting connections to said brushes, said contact means being separated when the head is disconnected from the body; and a removable head assembly for the other end of the said casing, including a casing head with an electric brake mounted therein for the motor; and a bearing for the adjacent end of the shaft, and contact means for effecting connection of the brake coil with one of the brushes when the last named head is moved axially into its seated position on the adjacent end of the casing.

8. In an easily assembled motor, the combination of: a casing body open at its ends and a cap disconnectably mounted on one end of said casing body; electrically actuated means within the cap connected into the motor circuit to cooperate in the operation of the motor; an armature within the casing having a commutator adjacent the other end of the casing; a disconnectable cap mounted on the other end of said casing body; brushes carried thereby adapted to slide over the armature when the last named cap is moved in axially and seated on the casing body; a tie bolt connected to the first named cap extending through the said casing body; a conductor-lead connected with the said electrical means in the first named cap and supported on said tie bolt and having contact means at its end adjacent to the second named cap; said second named cap having contact means to align with the first named contact means and engage the same when the second named cap is being attached to the casing body, and operating to establish a circuit through one of the brushes.

9. An easily assembled motor according to claim 2 in which insulating means is placed in the openings back of the brushes; and in which the said keeper means includes a resilient yoke with a finger adjacent each end pressing yieldingly on the insulating means to retain the brushes.

10. In an easily assembled motor having a commutator rotating within the same, the combination of: a casing member having an open end; a cap for said open end, said cap having openings therein to receive brushes; brushes insertable into said openings from the outside of said casing; and a keeper comprising a yoke in the form of a bar extending diametrically across the outer face of the cap, said yoke having ends terminating in fingers adapted to be so positioned as to retain the brushes within said openings.

11. In an easily assembled motor having a commutator rotating within the same, the combination of: a casing member having a removable cap adjacent the commutator, said cap having openings therein to receive brushes; and brushes insertable into said openings from outside of the cap, with keeper means, having a portion extending across the outer face of the cap for retaining the brushes in their openings.

12. In an easily assembled motor having a casing body open at an end and having a field coil and poles in said casing, an armature having a commutator, said armature and commutator being disposed within said casing for cooperation with said coil and poles, and brushes engageable with the commutator, the combination of: a disconnectable casing cap for said open end of the casing body; a brake and brake coil carried in said cap; a lead from the brake coil terminating in a contact; and a contact connected with one of the brushes and operating to engage the same and connect the brake coil to said brush when said disconnectable casing cap is moved into position to secure the same to its end of the casing body.

13. In an easily assembled motor having a commutator rotating within the same, the combination of: a casing having a wall located adjacent to the commutator, said wall having openings therein to receive brushes; brushes insertable into said openings from outside of said casing; means connecting the brushes into the motor circuit; insulating means in the openings back of the brushes; and keeper means, having a portion extending across the outer face of the wall, for engaging said insulating means and retaining the brushes in their openings.

14. In an easily assembled motor having a casing with a rotor and a shaft, and brushes comprising: a detachable cap for said casing; a brake in said cap; electromagnetic means for controlling said brake, said brake being so constructed and arranged as to apply braking force to said shaft; resilient means for normally holding the brake in an operative position; a heat sensitive member within the cap; means cooperating therewith for breaking the motor circuit when the part of the motor adjacent to the heat sensitive member becomes overheated; and an electrical contact, connected with the electromagnetic means, and so constructed and arranged as to engage one of the brushes and to be separated therefrom by detachment of the cap from the casing.

JAMES E. CHAPMAN.

REFERENCES CITED

The following references are of record in the file of this patent:

UNITED STATES PATENTS

| Number | Name | Date |
|---|---|---|
| 1,751,209 | Kucher | Mar. 18, 1930 |
| 1,817,597 | Zabriskie et al. | Aug. 4, 1931 |
| 1,930,539 | Renshaw et al. | Oct. 17, 1933 |
| 1,933,628 | Kitto | Nov. 7, 1933 |
| 2,211,006 | Doughman | Aug. 13, 1940 |
| 2,213,889 | Schaeffer | Sept. 3, 1940 |
| 2,214,807 | Buckley | Sept. 17, 1940 |
| 2,267,114 | Lear et al. | Dec. 23, 1941 |
| 2,348,684 | Perkins | May 9, 1944 |

Certificate of Correction

Patent No. 2,514,693                                              July 11, 1950

JAMES E. CHAPMAN

It is hereby certified that error appears in the printed specification of the above numbered patent requiring correction as follows:

Column 3, line 26, for the word "casting" read *casing*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*